Oct. 9, 1956　　　H. N. WEBSTER　　　2,765,806
WATERING SYSTEMS
Filed Dec. 17, 1953
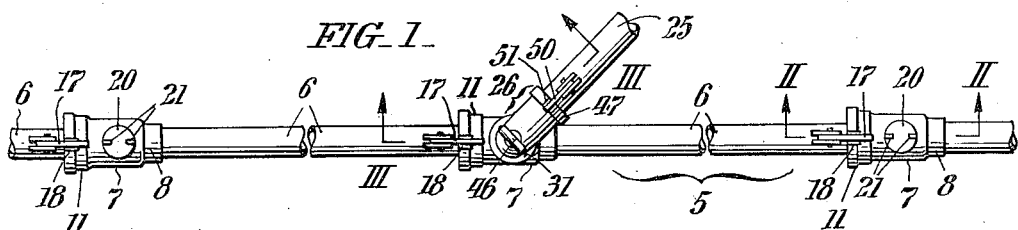
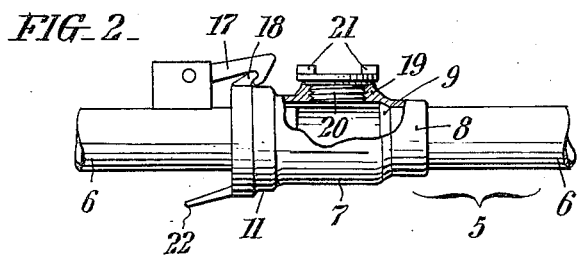
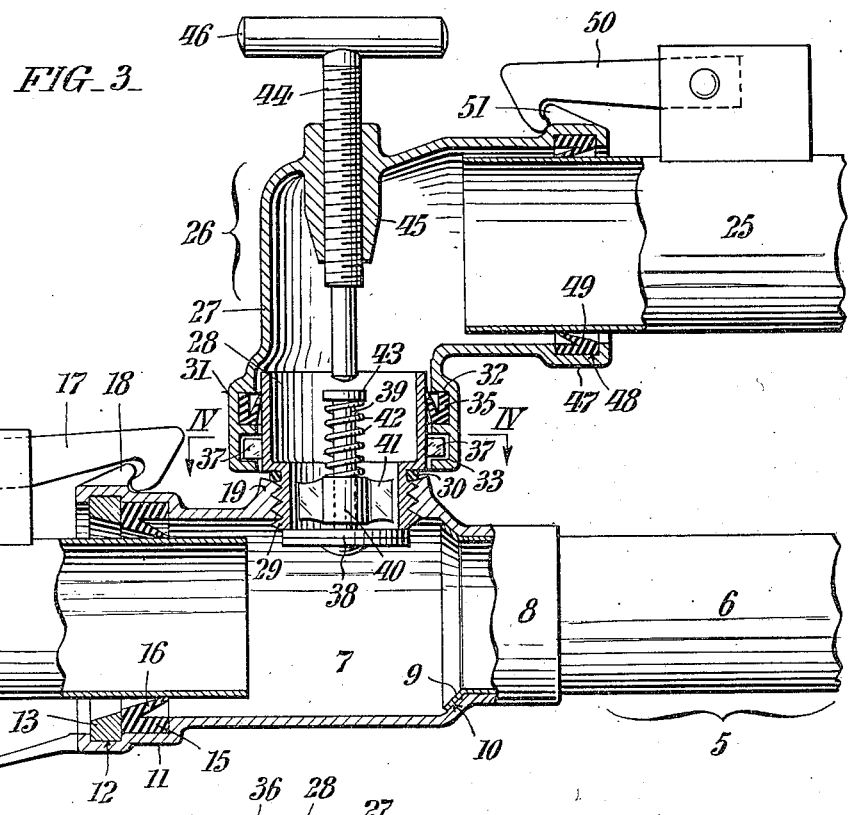
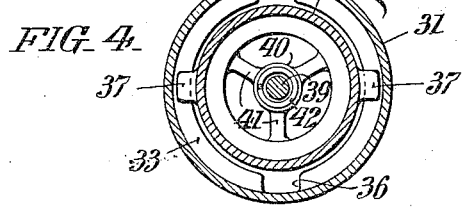
INVENTOR:
Henry N. Webster,
BY Paul & Paul
ATTORNEYS.

United States Patent Office 2,765,806
Patented Oct. 9, 1956

2,765,806

WATERING SYSTEMS

Henry N. Webster, Sebring, Fla., assignor to The Webster Corporation, Sebring, Fla., a corporation of Florida Application December 17, 1953, Serial No. 398,734

1 Claim. (Cl. 137—322)

This invention relates to watering systems for use more particularly on farms equipped with pipe mains leading from a pressurized supply source of water.

The chief aim of my invention is to provide the pipe mains of such systems, at intervals, with taps to permit selective swivel connection of an auxiliary pipe or hose through which sprinkle or spray water can be conducted for discharge over different areas which could not otherwise be reached.

A further aim of my invention is to provide a swivel connection with incorporated valve means by which the rate of water flow through the auxiliary pipe or hose can be controlled as may be desired or required.

Still another object of my invention is to attain the above advantages in a swivel connection which is easily and quickly attached or removed from the pipe main without necessitating the use of any tools other than an ordinary wrench.

Other objects and attendant advantages will appear from the following detailed description of the attached drawings, wherein:

Fig. 1 is a fragmentary view in top plan of a water supply main with an auxiliary pipe or hose connection conveniently embodying my invention.

Fig. 2 is a fragmentary view, partly in elevation and partly in section taken as indicated by the angled arrows II—II in Fig. 1 and drawn to a larger scale.

Fig. 3 is a view, partly in elevation and partly in section taken as indicated by the angled arrows III—III in Fig. 1 and drawn to a still larger scale; and Fig. 4 is a horizontal detail section taken as indicated by the angled arrows IV—IV in Fig. 3.

As shown, the water main generally designated by the numeral 5 is made up of a plurality of aligned pipe sections 6 which are united by couplings 7. Each of the couplings 7 is tubular in form and has a small mouth 8 at one end into which one end of one section 6 fits snugly and, incident to assembling, is flanged as at 9 over a sloped annular shoulder 10 within the coupling as best seen in Fig. 3. The corresponding end of the next pipe section 6 is received in the larger or bell end 11 of the coupling 7, said bell end being provided with an internal circumferential groove 12 for lodgment of split retaining ring 13 for an annularly split gasket 15 of which the inwardly directed lip 16 seals fluid tight circumferentially about the end of said section. Due to the described formation of the gasket 15, the tightness of the seal obviously increases with increase in the pressure of the water passing through the pipe main. Dislodgment of the end of the last mentioned pipe section by the pressure of the passing water is prevented by a retractable pivoted retaining latch 17 thereon which hooks over a keeper lug 18 on the coupling 7. At the top, each coupling 7 has a short internally-threaded neck 19 for reception ordinarily, as shown in Fig. 2, of a threaded screw cap 20 having upstanding diametral projections 21 for convenience of wrench application in tightening or loosening the cap. Each coupling 7 is provided, moreover, with a spur projection 22 for anchorage in the soil with the neck 19 uppermost.

In order to enable connection of auxiliary discharge or spray pipes, such as shown at 25 in Figs. 1 and 3, to the main 5 upon removal of any one of the caps 20, I have provided a specially designed valve 26. In addition to an elbow body 27, the valve 26 comprises a tubular plug component 28 of which the lower or smaller end 29 is threaded to screw into the neck 19 of the coupling 7 with interposition of an O ring gasket 30 between the shoulder of said plug and the top of the neck. The inlet end 31 of the valve body 27 fits downwardly over the upper portion of the plug component 28 and is provided with two closely adjacent internal grooves 32 and 33. As shown, the groove 32 is occupied by an annularly split resilient gasket 35, similar to the gasket 15 previously mentioned, of which the inwardly contracting lip seals circumferentially about the projecting upper portion of plug 28. The bottom flange wall of groove 33 has diametral notches 36 (see Fig. 4) to clear diametral lugs 37 on the plug 28 when the valve body 27 is applied downwardly over said plug. By a partial rotation of the valve body 27, the notches 36 are shifted out of registry with the lugs 37 as in Fig. 3 to cooperate with the bottom flange wall of the groove 33 in holding the valve in place. Arranged to seat against the inner or bottom end of plug 28 is a closure disk 38 whereof the stem 39 is guided in the axial boss 40 of a spider 41 integral with said plug. A helical spring 42 in compression between the boss 40 and a head 43 serves to maintain the closure 38 normally engaged with its seat. The closure 38 is operable by means of a screw spindle 44 which threadedly engages through a boss 45 at the top of the valve body 27 and of which the lower end is adapted to react upon the head 43 of the stem 39 to depress the closure 38 when the valve is to be opened. At its upper or external end, the spindle 44 is provided with a cross bar 46 for convenience of manipulating it. The lateral or outlet end 47 of the valve body 27 has an internal circumferential groove 48 occupied by a split resilient gasket 49 of which the lip seals fluid tightly about the auxiliary or discharge pipe 25 in the same manner as previously explained in connection with the rings 15 and 35. The discharge pipe 25 is restrained against dislodgment by a pivoted latch 50 thereon which hooks over a lug 51 on the outlet end 47 of the valve body 27 in the same way as described in connection with the coupling 7.

As a consequence of being swivelly locked to the main 5, the auxiliary or discharge pipe 27 can be swung through an angle of substantially one hundred and eighty degrees incident to sprinkling or spraying water over a large field area.

Having thus described my invention, I claim:

A coupling with an incorporated valve, said coupling comprising a hollow tubular body with a pipe section permanently connected to one end thereof and having a bell at the other end to slidably receive an end of another pipe section; a ring gasket lodged in an internal groove within the bell end of the body to seal about said other pipe; a tubular insert threadedly engaged into a lateral opening in the body and having a protruding neck; a hollow elbow fitting with a bell at one end thereof slidably and swivelly engaged over the protruding neck of the insert and with a bell at its other end to slidingly receive one end of a third pipe section; ring gaskets lodged within internal circumferential grooves in the bell ends of the fitting to seal respectively about the protruding portion of the insert and about said third pipe section; a closure element adapted to seat against the inner end of the insert and having an axial stem slidably guided in a cross web spanning the interior of the insert; a spring in compression between a head at the distal end of the stem of the closure element and the cross web for normally maintaining said element engaged with its seat; and a normally-retracted actuating spindle threadedly engaged in the wall of the elbow fitting for displacing the closure element from its seat to permit fluid flow between the several pipe sections.

References Cited in the file of this patent

UNITED STATES PATENTS

| | | |
|---|---|---|
| 277,872 | Boone | May 22, 1883 |
| 478,716 | Schlangen | July 12, 1892 |
| 1,169,418 | Morris | Jan. 25, 1916 |
| 1,836,133 | Rosewood | Dec. 15, 1931 |
| 2,355,408 | Wyss | Aug. 8, 1944 |
| 2,589,321 | Anderson | Mar. 18, 1952 |

FOREIGN PATENTS

| | | |
|---|---|---|
| 3,838 | Great Britain | Feb. 16, 1904 |